Figure 1:
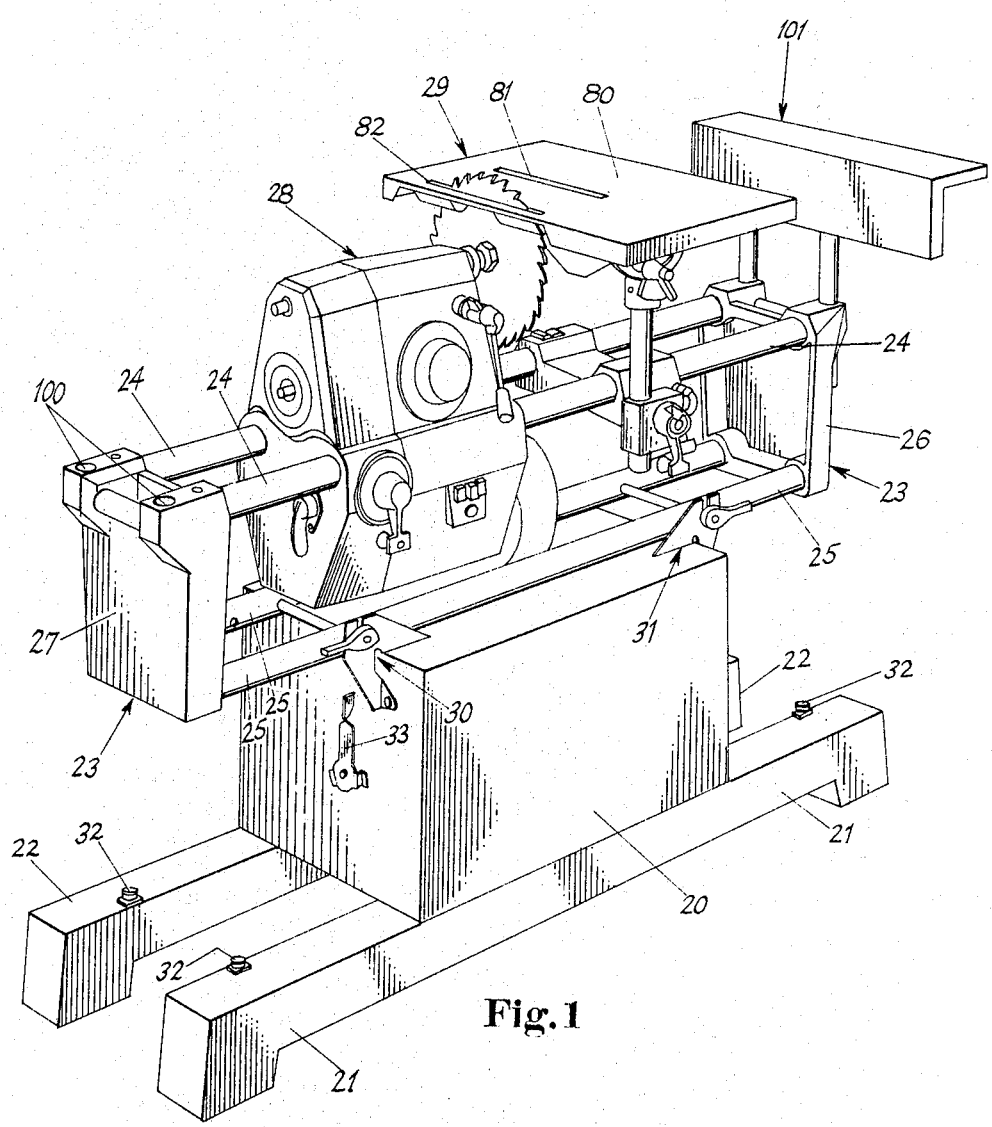

INVENTOR.
HENRY M. PARKER AND
FRANK H. FIELD,
BY Yungblut, Melville, Strasser + Foster
ATTORNEYS.

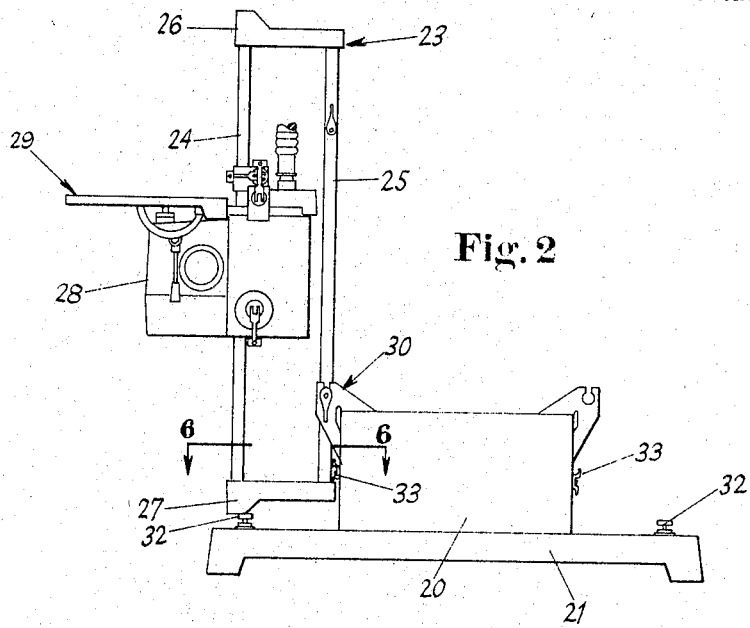
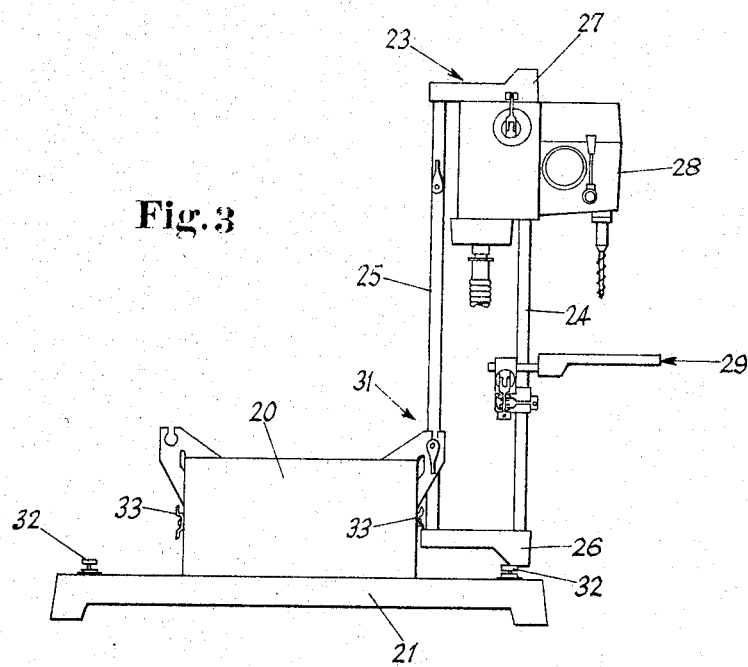

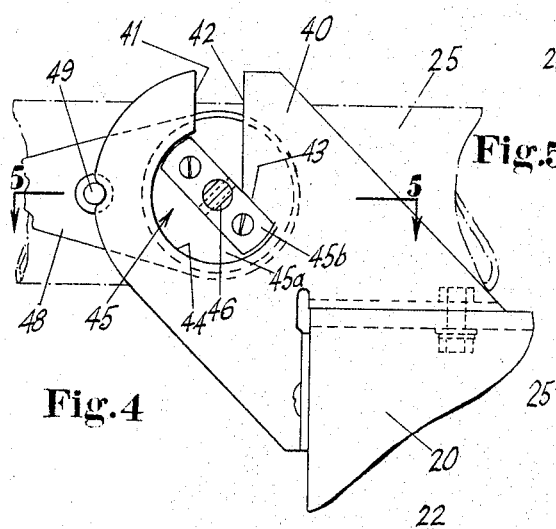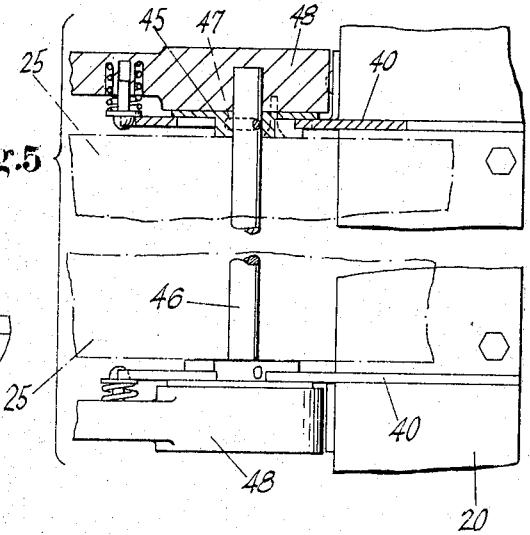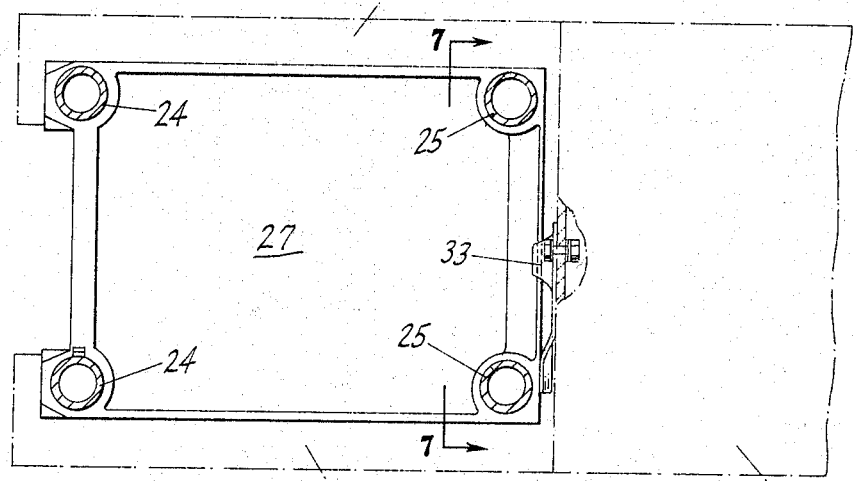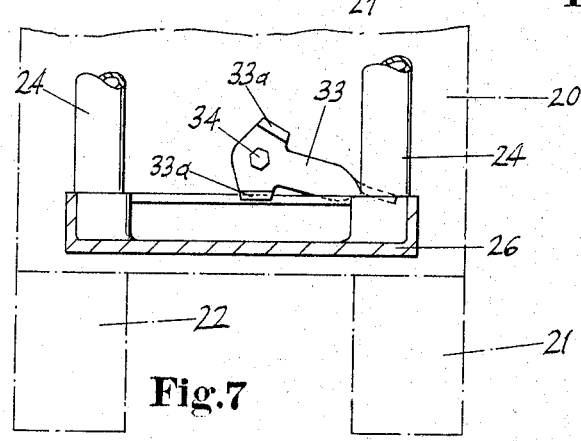

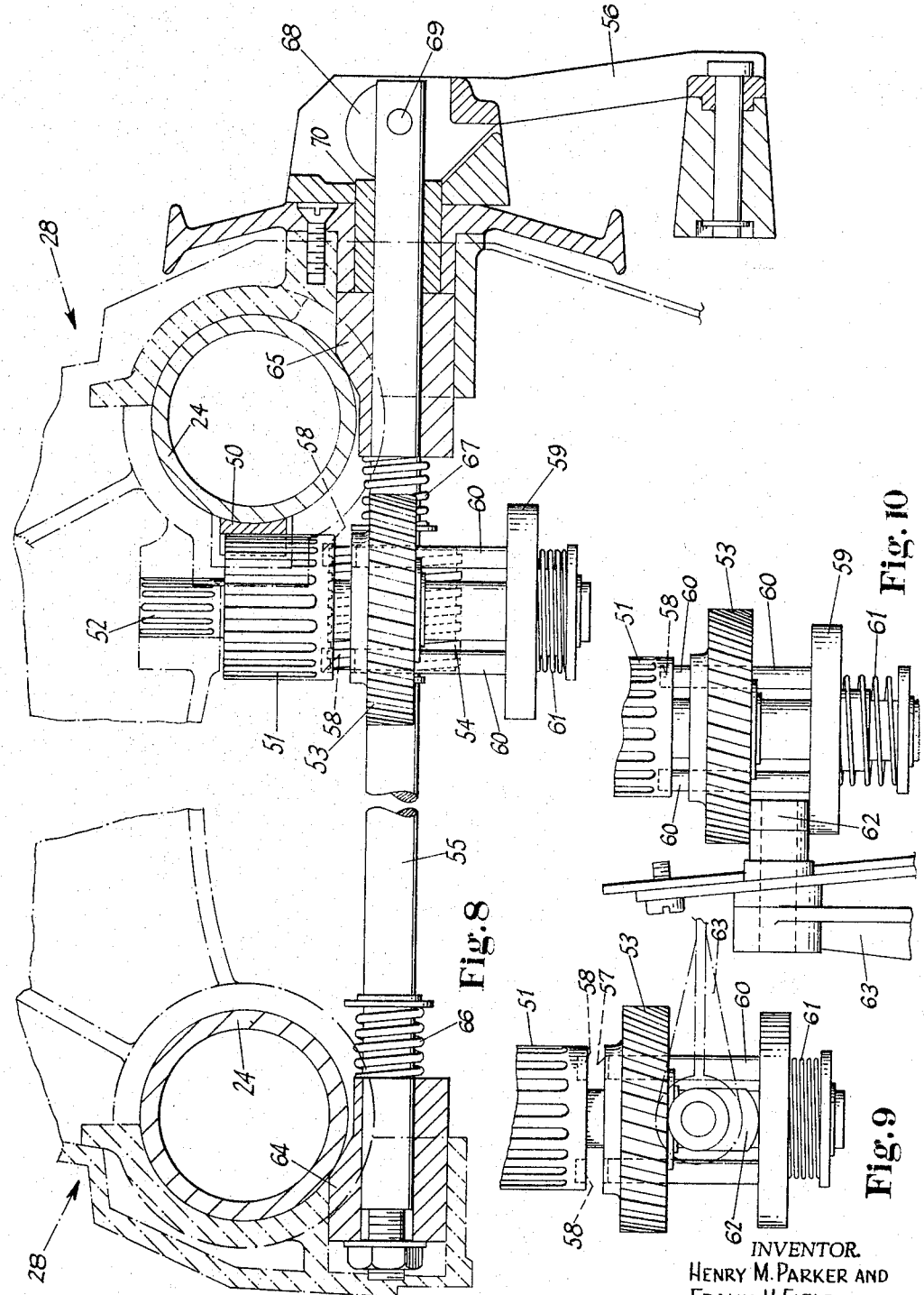

Nov. 1, 1966 H. M. PARKER ETAL 3,282,309
MULTI-PURPOSE POWER TOOL
Filed Jan. 29, 1964 6 Sheets-Sheet 5

INVENTOR.
HENRY M. PARKER AND
FRANK H. FIELD,
BY
ATTORNEYS.

INVENTOR.
HENRY M. PARKER AND
FRANK H. FIELD,
BY
ATTORNEYS.

United States Patent Office 3,282,309
Patented Nov. 1, 1966

3,282,309
MULTI-PURPOSE POWER TOOL
Henry M. Parker and Frank H. Field, Cincinnati, Ohio, assignors to Magna American Corporation, Cincinnati, Ohio, a corporation of Ohio
Filed Jan. 29, 1964, Ser. No. 341,041
16 Claims. (Cl. 144—1)

This invention relates to power woodworking machinery, and more particularly to a power tool which is readily convertible to perform a multiplicity of different woodworking operations.

It has long been realized that many of the basic power woodworking tools include the same basic machine components. That is, for example, a table saw, a drill press, and a shaper all include a motor, a head stock, a spindle, and a work table, while a lathe includes them all except for the work table. Of course, in spite of these similarities, all of these tools differ in the relationship of the various basic components to each other. U.S. Patent No. 2,623,269 in the name of Goldschmidt is illustrative of an early effort to provide a multi-purpose or combination tool embodying the basic machine elements listed above, and a unique mounting system whereby the relationship between these basic elements could be changed so that the tool could be set up as a number of different pieces of woodworking equipment. U.S. Patent No. 2,927,612 in the name of Edgemond, Jr., et al., is a more recent and refined development of the basic combination tool.

By way of example, the combination tool described in the last mentioned U.S. patent may be set up as a table saw, a disk sander, a lathe, a vertical drill press, or a horizontal drill. While the designed construction of this machine has been largely satisfactory, the instant application is directed to a new and improved combination power tool embodying the basic principles of its predecessors.

A primary object of this invention is the provision of a multi-purpose woodworking tool which is tiltable in two directions; that is, to a first position for use as a vertical drill press, in which the head stock and spindle are above the work table, or to a second position for use as a spindle shaper, wherein the motor, headstock, and spindle are disposed below the work table.

Another object of this invention is to provide a structure for mounting the motor, headstock, and work table which is more rigid than was possible with the prior art structure.

A further object of this invention is the provision of a mounting arrangement which is adequately supported and secure when titlted to a vertical position.

Still another object of this invention is the provision of an improved work table extension, which may be mounted in either the work table itself, or in a remote stand, to give added support to large sized work pieces.

Sill a further object of this invention is to provide an improved gear arrangement for moving the head stock and motor assembly along the machine ways, this gear assembly being disengageable to permit free sliding movement of the motor and head stock assembly as desired.

A further object of this invention is the provision of an inter-latch between the motor and head stock assembly and the work table, whereby the work table may be accurately positioned with respect to the head stock.

Still a further object of this invention is to provide an arrangement wherein a sawdust vacuum may be driven directly from the tool motor.

Figure 11:
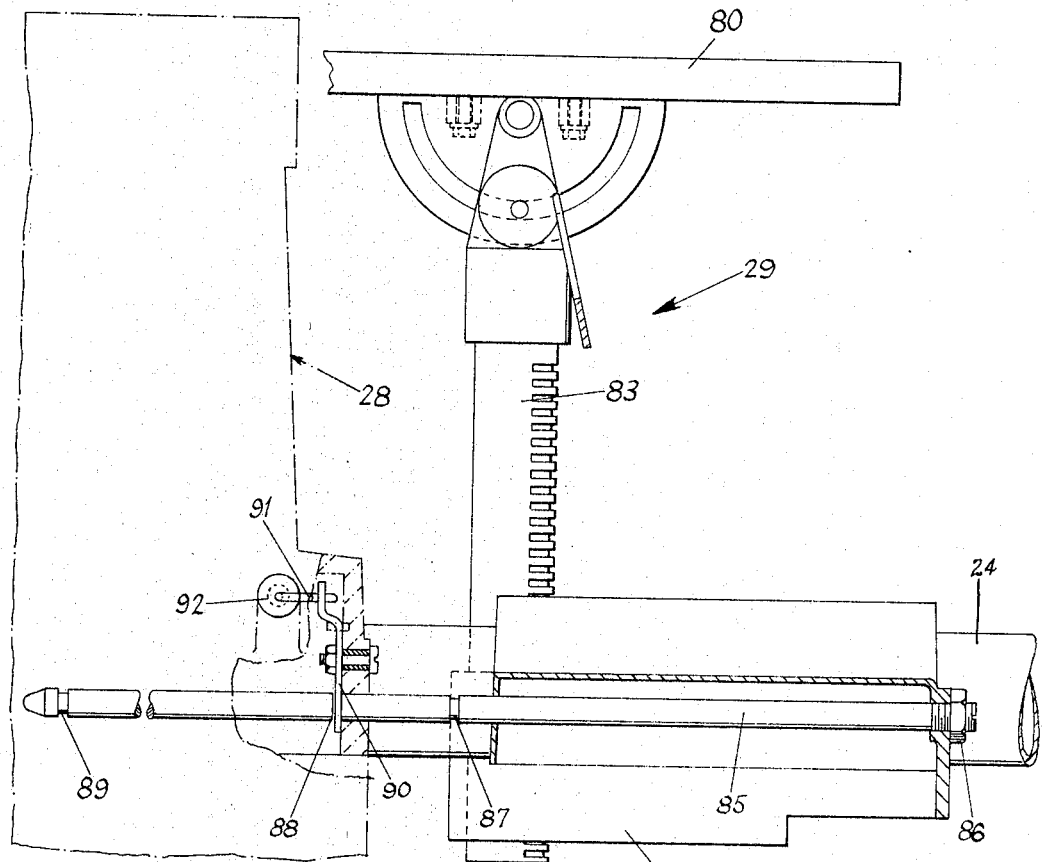
Figures 12, 15:
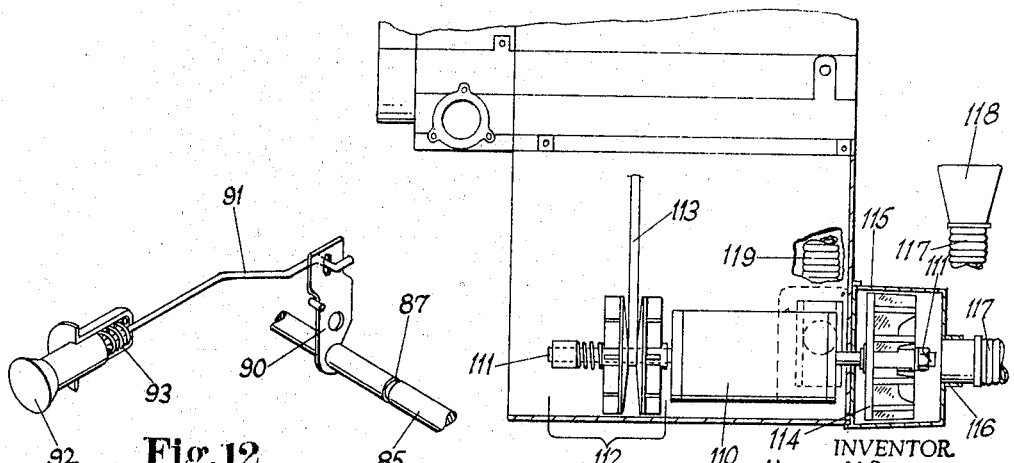
Figure 13:
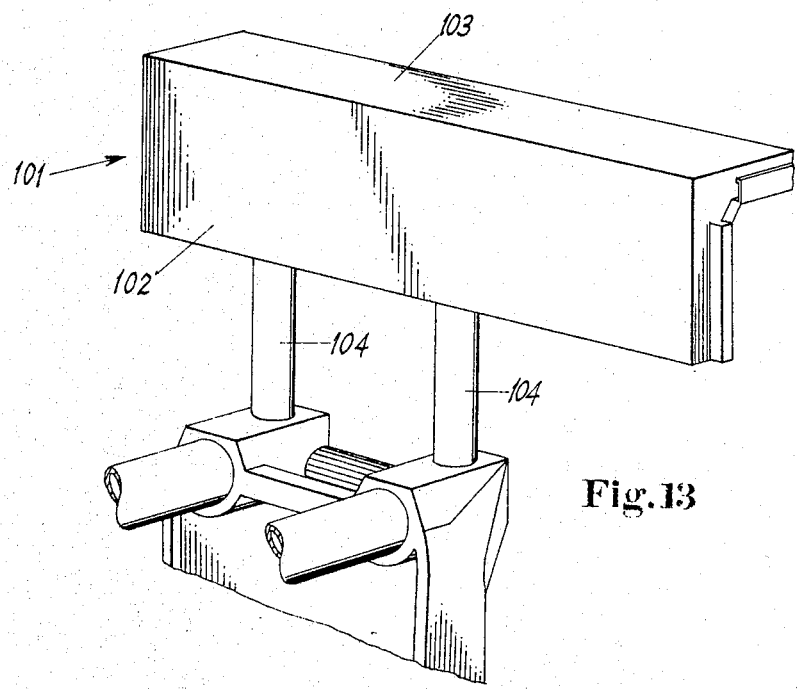
Figure 14:
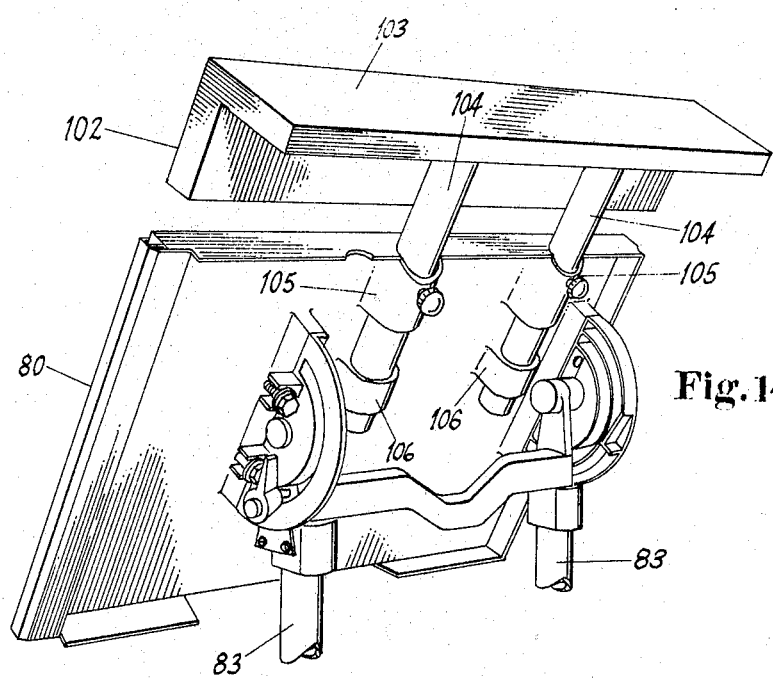

These objects, along with others which will become apparent to the skilled worker in the art upon reading these specifications, are accomplished by that certain construction and arrangement of parts shown in an exemplary embodiment in the accompanying drawings, in which:

FIGURE 1 is a perspective of a multi-purpose woodworking tool embodying the teachings of this invention;
FIGURE 2 is a side elevational view showing the tool of FIGURE 1 set up for operation as a shaper;
FIGURE 3 is a side elevational view showing the tool of FIGURE 1 set up for use as a vertical drill press;
FIGURE 4 is a side elevational view on a greatly enlarged scale showing the releasable pivot means, through which the tiltable portions of the tool are secured to the base;
FIGURE 5 is a horizontal sectional view taken along the line 5—5 of FIG. 4;
FIGURE 6 is a cross-sectional view taken along the line 6—6 of FIG. 2;
FIGURE 7 is a cross-sectional view taken along the line 7—7 of FIG. 6;
FIGURE 8 is a cross-sectional view showing the gear drive for moving the motor and headstock assembly along the ways;
FIGURE 9 is a cross-sectional view showing the lower portion of the gear drive of FIGURE 8, and indicating the cam clutch;
FIGURE 10 is a front view through the housing showing the cam clutch of FIG. 9;
FIGURE 11 is a side elevational view, with parts in section and parts broken away showing the interlatch between the headstock unit and the work table;
FIGURE 12 is a perspective view showing the spring release means for the interlatch of FIG. 11;
FIGURE 13 is a perspective view showing the table extension mounted in one of the end castings of the tool of this invention;
FIGURE 14 is a perspective view showing the extension of FIG. 13 secured to the main work table; and
FIGURE 15 is a front elevational view showing the arrangement of certain components of the headstock assembly.

Referring now to FIGURE 1, the general arrangement and relationship of the various components will now be described. The multi-purpose power tool of this invention includes the base 20 having the outwardly extending legs 21 and 22. Releasably secured to the base 20 adjacent its end edges is the machinery mounting means indicated generally at 23. The machinery mounting means 23 includes the set of ways 24, the support members 25 which are arranged parallel to the ways 24, and the end castings 26 and 27 which receive and are secured to corresponding ends of the ways and support members.

Slidable upon the ways 24 are the headstock assembly indicated generally at 28, and the work table assembly indicated generally at 29. As described in more detail hereinafter, the headstock assembly 28 will include a working spindle, a motor, and a power transmission linkage interconnecting the motor and spindle, and the work table assembly 29 includes a table mounting casting slidable upon the ways and the adjustable work table itself.

The spaced apart releasable pivot means indicated generally at 30 and 31, serve to secure the entire machinery mounting means 23 described above, to the base 20 adjacent its end edges. As explained in more detail hereinafter, applicant's construction permits the machinery mounting means to be selectively secured in a horizontal position, wherein the multi-purpose power tool may be utilized as a table saw, a disk sander, or a lathe, or tilted to the vertical position shown in FIG. 3, wherein the headstock assembly 28 is above the work table assembly 29, and the tool may be used as a vertical drill press, or to the inverted vertical position shown in FIG. 2, wherein the headstock assembly 28 is below the work table 29, and the power tool may be utilized as a spindle shaper.

It may be noted at this time that the basic construction just described provides a mounting arrangement which is highly rigid, adequately supported, and secure when tilted to either the vertical position or the inverted vertical position described above. That is, for example, the pivot means 30 may be released, and the entire machinery mounting means pivoted about the means 31 to the position shown in FIG. 3. In this position, the end casting 26 rests upon the leveling bolts 32. The locking lever 33 then engages a portion of the casting 26 to lock the assembly in this position. It will be apparent that the rigidity of the structure in the vertical position will in large part be determined by the distance between the support points; and it should also be apparent that the distance between the support points 31 and 32 (or 30 and 32 in FIG. 2), is substantially greater than was possible with the arrangements of the prior art.

The locking means 33 mentioned briefly above is shown in detail in FIGS. 6 and 7. It is simply a formed lever pivotally secured to the base 20 as by the bolt 34, and includes the offset catches 33a. When tilted from the generally vertical position of FIG. 1 to the generally horizontal position of FIGS. 6 and 7, the catch 33a will engage the edge of one of the end castings 26 or 27, securely holding the casting against the base 20 and thereby locking the machinery mounting means in either the vertical or inverted vertical position.

Turning now to FIGS. 4 and 5, the releasable pivot means 30 will be described in more detail. Since the pivots 30 and 31 are identical, it is believed that the description of the releasable pivot 30 will be sufficient for a complete understanding. These pivot means each include a pair of brackets 40 secured adjacent the end edge of the base 20 in any suitable manner. The bracket 40 is provided with a shaped aperture including a key opening or entrance defined by the walls 41 and 42, a flat or stop portion 43, and an arcuate portion 44.

Cooperating with the bracket and aperture is the locking means 45 rotatably secured to the support members 25. In the embodiment shown, a shaft 46 passes all the way through both of the support members 25, and carries in to its outer ends the locking means 45, as at 47. The extreme ends of the rod 46 carry the handles 48. As clearly shown in FIG. 4, the locking means indicated generally at 45 includes a circular portion 45a and the lug 45b, the width of which is such that it may nicely pass between the walls 41 and 42 of the opening to the aperture in the bracket 40.

In the position shown in FIG. 4, the handle 48 and locking means 45 have been rotated to a generally horizontal position wherein the bullet catch 49 clips into a mating notch in the bracket 40, and wherein the lug 45b of the locking means abuts the stop portion 43 of the aperture. When so engaged, the locking means is secured in the aperture, and the machinery mounting assembly may be pivoted about the shaft 46. To release the pivot means, the handle 48 is rotated in a clockwise direction when viewed as in FIG. 4, bringing the lug 45b of the locking means 45 into alignment with the opening defined by the walls 41 and 42. In this position, the machinery mounting means may be pivoted about the other pivot means, and the locking means 45 may be withdrawn from the aperture in the process.

As briefly mentioned earlier in this specification, the headstock assembly 28 and the wood table assembly 29 are slidable along the ways 24. It will therefore be apparent that unless positive means are provided to lock these assemblies against free sliding movement along the ways, the tilting movements described above can only be accomplished with considerable difficulty. Applicants have solved this problem by providing the unique gear means for moving the headstock assembly along the ways 24, which is shown in FIGS. 8, 9, and 10.

This gear means includes the rack 50 mounted on the inner side of one of the ways 24. This rack is in meshing engagement with a pinion 51, which is mounted for free rotation about the fixed shaft 52. Also mounted for free rotation about the shaft 52 is the worm wheel 53 which is in meshing engagement with the worm 54 pinned to the shaft 55. Rotation of the crank or handle 56 turns the shaft 55 and worm 54, which in turn drive the worm wheel 53.

To secure the pinion 51 to the worm wheel 53 for rotation therewith, the worm wheel is provided with the apertures 57, and the pinion is provided with the mating recesses 58. A clutch plate 59 carrying the pins 60 is mounted on the shaft 52 and movable axially from a retracted position (FIGURES 8 and 9) to an extended position (FIGURE 10) in which the pins 60 extend through the apertures 57 and are engaged in the recesses 58. The compression spring 61 serves to normally urge the clutch plate 59 and pins 60 to the extended position. As will now be apparent, rotation of the crank or handle 56 is transmitted through the shaft 55, and worm 54 to the worm wheel 53 and pinion 51, which serves to move the entire headstock assembly 28 along the ways 24. As is well known in the art, it is impossible to operate a worm drive in reverse. That is, you cannot turn the worm by driving the worm wheel. Therefore, when the various components described above are engaged in the position shown in FIG. 10, the headstock assembly is effectively constrained against free sliding movement along the ways 24.

Since in certain cases, such free sliding movement is desirable, the cam 62 is located between the clutch plate 59 and the worm wheel 53. By turning the handle 63, the cam 62 will move the clutch plate 59 and pin 62 to the retracted position, against the resistance of the compression springs 61. In this position, the pinion 51 is free to rotate about the shaft 52 even though the worm wheel 53 is essentially fixed thereto.

The gear means described above is entirely adequate to prevent accidental sliding of the head stock assembly 28 along the ways 24 during the operation of tilting the machine to the vertical or inverted vertical position. However, during actual working operation, it is very desirable to have a more positive lock for securing the headstock assembly 28 to the ways 24. In the embodiment shown, this is accomplished by the locking cams 64 and 65, the former being fixed to the shaft 55, while the latter is slidable along the shaft 55. The locking cams 64 and 65 are urged outwardly to the released position by the compression springs 66 and 67 respectively. The locking cams 64 and 65 are brought into locking engagement with the ways 24 by means of the cam surface 68 on the end of the crank or handle 56. That is, pivoting the handle 56 about the pin 69 in a clockwise direction to the position shown in FIG. 8, will tend to move the shaft 55 and the locking cam 64 to the right, and will also tend to move the locking cam 65 to the left by applying force to the sleeve 70. Conversely, the rotation of the handle 56 about the pin 69 in a counter-clockwise direction will permit the shaft 55 and locking cam 64 to move to the left, and the locking cam 65 to move to the right, thereby unlocking the headstock assembly for movement along the ways 24.

Referring briefly to FIG. 1, it will be seen that the surface 80 of the work table assembly is provided with the parallel slots 81 and 82. When the tool of this invention is set up for use as a table saw, as in FIG. 1, the saw blade itself will project upwardly through one of the two slots. Choice of the appropriate slot will depend upon the size of the workpiece, and the location of the cut with respect to the work piece. That is, if a cut is being made near the end of the work piece, the saw blade may be located in the slot 82 so that the majority of the work piece will be supported by the work surface 80. And on the other hand, if the cut is near the center of the work piece, the saw blade will preferably be located in the slot 81 so that each side of the work piece will be supported. In any event, it will be apparent that since both the headstock assembly 28 and the work table assembly 29 are independently slidable along the ways 24, it would be desirable to provide means for locating the work table assembly with respect to the headstock assembly so that the saw blade would be accurately positioned with respect to the slots 81 and 82.

One embodiment of a satisfactory interlatch is shown in FIGS. 11 and 12. In FIG. 11, it will be seen that the work table assembly 29 includes the work surface 80, the work table supports 83 and the work table mounting casting 84. The interlatch arrangement includes the rod 85 which is bolted to the mounting casting 84 as at 86. The free end of the rod 85 extends parallel to the ways 24 and directed toward the headstock assembly 28. This rod 85 is provided with the annular grooves 87, 88 and 89. Within the housing of the headstock assembly is the spring loaded latch means including the latch member 90, which is adapted to engage selectively any one of the grooves 87, 88 or 89. The upper end of the pivoted latch member 90 is connected by the formed wire 91 to the latch release button 92 which projects out the front of the headstock housing. The spring 93 of course tends to urge the latch member 90 to its engaged position, but is easily overcome by pressure on the latch release 92. The annular grooves 87, 88 and 89 are so located that when the latch member 90 is engaged within any one of them, the work table will be properly located with respect to the headstock assembly for a given operation. For example, when the latch member 90 is engaged in the groove 89, a saw blade on the spindle of the headstock assembly 28 will project upwardly through the slot 82; when the latch member 90 is engaged in the groove 88, the saw blade will extend through the slot 81; and when the latch member 90 is engaged in the groove 87, the mounting casting 84 will be secured immediately adjacent the headstock assembly 28. This position is utilized when tilting the machinery mounting means to the inverted vertical position shown in FIG. 2, wherein the tool is used as a spindle shaper, and serves to set the correct height of the spindle above the work table. It will, of course, be obvious by examining FIG. 2 that in this arrangement, the work surface 80 has been tilted 90° from the position shown in FIG. 11.

When the interlatch thus described is engaged, the relationship between the work table assembly 29 and the headstock assembly 28 is fixed, and it will be possible to move these two assemblies in unison along the ways 28 in the manner described earlier in this specification.

Referring once again to FIG. 1, it will be seen that the end castings 26 and 27 are each provided with the vertical apertures 100, which serve as a remote stand on which can be mounted a table extension, or various other accessory tools as set forth in the earlier patents referred to at the outset. The table extension 101 includes a first surface 102 and a second surface 103 abutting the surface 102 at right angles. Associated with the surface 102, and extending outwardly beyond its free edge are the mounting members 104, which as indicated above, may be received in the apertures 100 in the end casting 26 or 27. When so mounted, it will be seen that the surface 103 is coplanar with the surface 80 of the work table assembly. When used in this manner, the remote table extension is spaced a relatively great distance from the saw blade, and hence it is desirable when handling extremely large work pieces.

As indicated in FIG. 14, the table extension just described may also be mounted in the sleeves 105 and 106 on the under side of the work table. When mounted in this manner the surface 102 is now coplanar with the surface 80 of the work table and the table is now suitable for handling work pieces of intermediate size.

FIGURE 15 is a front elevational view of the lower portion of the headstock assembly 28 with the front of the housing cut away. The electric motor 110 will be mounted in the assembly in any conventional manner.

The left end of the motor shaft 111 mounts the adjustable pulley 112, which drives a mating pulley on the working spindle through the belt 113. This general arrangement is entirely conventional.

The right end of the motor shaft 111 mounts the blower impeller 114 contained in the blower housing 115. The blower intake port 116 is provided with a flexible hose 117 and nozzle 118, while the blower exhaust or outlet port is provided with the short flexible hose 119 which leads to a suitable container (not shown) conveniently located within the base 20.

It is apparent that since the vacuum blower is driven directly by the motor 110, it will operate whenever the motor itself is turned on. This makes it possible to arrange the intake hose 117 and nozzle 118 so that sawdust is sucked up as it is formed.

Numerous modifications which are within the scope and spirit of this invention will readily occur to the skilled worker in the art. Accordingly, while the invention has been described in terms of an exemplary embodiment, no limitations are intended except insofar as set forth in the following claims.

What is claimed as new, and what it is desired to secure by Letters Patent is:

1. In a multi-purpose power tool including a headstock assembly, a spindle, and a work table assembly, the improved universal mounting comprising:
 (a) a base;
 (b) machinery mounting means adapted to mount at least said headstock assembly and said work table assembly, said mounting means being longer than said base; and
 (c) spaced apart releasable pivot means securing said mounting means to said base adjacent the end edges of said base whereby said machinery mounting means may be selectively secured in a horizontal position, a vertical position adjacent one end of said base, or an inverted vertical position adjacent the other end of said base.

2. The power tool claimed in claim 1 wherein said machinery mounting means comprises:
 (a) a set of ways, said headstock assembly and said work table assembly being slidable on said ways;
 (b) support means parallel to said ways; and
 (c) a pair of end castings, corresponding ends of said ways and said support means being secured in said end castings.

3. The power tool claimed in claim 2 wherein said releasable pivot means each comprise a bracket secured to said base, said bracket having an aperture therein, locking means rotatably secured to said support means and receivable in said aperture, and means for rotating said locking means when said locking means is received in said aperture, whereby said locking means is secured in said aperture.

4. The power tool claimed in claim 3 including means for locking said machinery mounting means in said vertical position and said inverted vertical position.

5. A multi-purpose power tool comprising:
 (a) a base;
 (b) machinery mounting means including a set of ways;
 (c) a head stock assembly slidable on said ways;
 (d) a spindle rotatably mounted in said headstock assembly;
 (e) a work table assembly slidable on said ways; and
 (f) releasable pivot means securing said machinery mounting means to said base adjacent the end edges of said base,
whereby said machinery mounting means may be selectively secured in a horizontal position, a vertical position adjacent one end of said base, and an inverted vertical position adjacent the other end of said base.

6. The power tool claimed in claim 5 wherein said releasable pivot means includes locking means rotatably secured to said machinery mounting means, cooperating bracket means secured to said base, and means for releasably securing said locking means to said bracket means.

7. The power tool claimed in claim 6 including means for locking said machinery mounting means in said vertical position and said inverted vertical position.

8. The machinery mounting means claimed in claim 5 including gear means for moving at least said headstock assembly along said ways, said gear means comprising a rack secured to one of said ways, a pinion in meshing engagement with said rack, a gear coaxial with the pinion, means for turning said gear, and means for releasably securing said pinion to said gear for rotation therewith.

9. The power tool claimed in claim 8 wherein said gear has at least one aperture, wherein said pinion includes at least one recess adapted to mate with the aperture in said gear, and wherein said means for releasably securing said gear to said pinion for rotation therewith comprises a clutch plate coaxial with said gear and said pinion, at least one pin secured to said clutch plate, said pin being received in said aperture and movable from a retracted position to an extended position engaging said recess, and means for moving said pin and clutch plate from said retracted position to said extended position.

10. The power tool claimed in claim 9 wherein said means for moving said pin and clutch plate from said retracted position to said extended position comprises spring means normally urging said clutch plate and pin to said extended position, and a cam disposed between said clutch plate and said gear and adapted to move said clutch plate and pin to said retracted position, against the resistance of said spring means.

11. The power tool claimed in claim 8 wherein said gear is a worm wheel, and said means for turning said gear comprises a shaft, a worm secured to said shaft in meshing engagement with said worm wheel, at least one locking cam on said shaft, crank means for turning said shaft, and cam means for moving said locking cam into locking engagement with one of said ways.

12. The power tool claimed in claim 5 including interlatch means releasably securing said headstock assembly to said work table assembly, whereby said work table may be accurately positioned with respect to said headstock assembly, and said headstock assembly and work table assembly may be moved along said ways in unison.

13. The power tool claimed in claim 12 wherein said interlatch means includes a rod associated with said work table assembly, said rod having at least one annular groove, and spring loaded latch means associated with said headstock assembly, and adapted to engage said groove.

14. In a multi-purpose power tool including a work table and a remote stand, said table and said stand each having mounting receptacles, the improved table extension comprising:
 (a) a first surface;
 (b) a second surface abutting said first surface at right angles, and
 (c) mounting means associated with said first surface, whereby said table extension may be mounted on said work table with said first surface coplanar with the surface of said work table, and said table extension may be mounted on said remote stand with said second surface coplanar with said surface of said work table.

15. The table extension claimed in claim 14 wherein said mounting means comprises a pair of mounting members parallel to said first surface and extending outwardly beyond the free edge of said first surface.

16. The power tool claimed in claim 5 including vacuum means associated with said headstock assembly, said vacuum means being driven directly by said motor.

References Cited by the Examiner
UNITED STATES PATENTS
3,217,852  11/1965  Brown et al. _____ 74—422

WILLIAM W. DYER, Jr., *Primary Examiner.*
W. D. BRAY, *Assistant Examiner.*